Patented June 12, 1928.

1,673,239

UNITED STATES PATENT OFFICE.

FRAZIER GROFF, OF BLOOMFIELD, NEW JERSEY, ASSIGNOR TO BAKELITE CORPORATION, OF NEW YORK, N. Y., A CORPORATION OF DELAWARE.

LAMINATED PRODUCT AND METHOD OF MAKING SAME.

No Drawing.    Application filed April 12, 1926.    Serial No. 101,582.

This invention relates to laminated sheets or articles, and comprises a structure of this type having definite advantages for certain uses where a high degree of toughness is required, combined with a certain pliability or yielding quality. Typical applications of this nature are silent gears, gaskets, piston-packings, clutch facings and the like. The invention also comprises the method of preparing the laminated product.

A preferred structure in accordance with my invention is made as follows:

A fibrous base which may be composed of paper or cardboard, of asbestos paper, board or cloth, or of a woven or felted fabric such for example as canvas or duck, according to the particular requirements of the article, is impregnated with a resin of the known glycerol-phthalic anhydride type, which expression is used herein to include broadly such resins as result from the interaction of polybasic alcohols, (glycerol, polyglycerols, etc.) with phthalic anhydride, alone or admixed with dibasic or monobasic organic acids, as succinic, oleic, stearic acids or the like. The resin may be incorporated into the fibrous sheet in any desired manner, as for example by treating the pre-formed sheet with an alcoholic or other solution of the resin followed by drying to expel the solvent; or by commingling the resin in a state of fine subdivision with the loose fibers, for example in a paper-beater, and thereafter laying into paper or board in the well-known manner. In whatever way the fiber-resin mixture is prepared, it is heated, preferably at about 110°–150° C., until the resin is converted into a tough, infusible, modification resistant to water and all ordinary solvents.

If the sheets so prepared are superposed and subjected to the action of a heated press, it is found that they unite only imperfectly. If on the other hand this operation is carried out before the resin is rendered insoluble the union of the sheets is somewhat improved but the transformation of the resin proceeds slowly and imperfectly. Accordingly I proceed as follows:

The fibrous sheets impregnated with the glycerol resin and baked as above described are coated, by dipping or spraying, with a reactive varnish of the phenol-methylene type and dried to expel the solvent, without however heating to a sufficient temperature or for sufficient time to destroy the reactive character of the phenolic resin. The coated sheets are then superposed to any desired number, and consolidated by heat and pressure, in a mold or between heated plates, the heat and pressure being maintained until the reactive phenolic resin is transformed to the infusible and insoluble (resinoid) modification.

Instead of coating the fibrous sheets with a varnish film of reactive phenol-methylene resin, I may interpose between them sheets of absorbent paper, or of woven fabric, impregnated with such reactive resin and thereafter dried; the whole being then consolidated in the manner described above. A laminated structure composed wholly of canvas, alternate sheets impregnated with a resin of the glycerol-phthalic anhydride type, and the intermediate sheets with a phenol-methylene resin, yields a tough, strong and shock-resistant structure, especially adapted for silent gear stock and similar applications. In all of its modifications, the laminated product made in accordance with this invention is characterized by high shock resistance, the tough and yielding glycerol resin appearing to absorb and distribute the strains set up in the relatively rigid phenol-methylene resin, and thereby to improve the shock-resistance characteristics of the composite structure.

I find it advantageous, especially in the case of the asbestos products, to provide exterior or facing sheets of paper or cloth impregnated with the phenol-methylene resin, these serving not only to improve the surface finish but to prevent any tendency to sticking in the mold.

I claim:

1. A laminated structure comprising fibrous sheets impregnated with a resin of the gylcerol-phthalic anhydride type, and bonded together by a phenolic resin.

2. Method of making a laminated structure comprising impregnating a fibrous base with a resin of the glycerol-phthalic anhydride type, drying the sheet to expel solvent and to set the resin, superposing the sheets with interposed reactive phenolic resin, and consolidating by application of heat and pressure.

In testimony whereof, I affix my signature.

FRAZIER GROFF.